United States Patent [19]

Lamelot et al.

[11] 4,117,327
[45] Sep. 26, 1978

[54] INFRARED DEVIATION MEASURING DEVICE

[75] Inventors: Pierre Marie Louis Lamelot, Ville d'Avray; Roland Georges Mousson, Soisy sur Seine, both of France

[73] Assignee: Societe Anonyme de Telecommunications, Paris, France

[21] Appl. No.: 813,186

[22] Filed: Jul. 5, 1977

[30] Foreign Application Priority Data

Jul. 8, 1976 [FR] France .............................. 76 20947
May 31, 1977 [FR] France .............................. 77 16574

[51] Int. Cl.² .............................................. G01J 1/00
[52] U.S. Cl. ...................................... 250/338; 250/342
[58] Field of Search ............... 250/338, 340, 342, 349, 250/353; 244/3.16

[56] References Cited

U.S. PATENT DOCUMENTS 3,564,257  2/1971  Berry et al. ...................... 250/342 X

*Primary Examiner*—Davis L. Willis
*Attorney, Agent, or Firm*—Holman & Stern

[57] ABSTRACT

A deviation measuring device for localizing an infrared radiation source relative to an optical axis, comprising a focalization lens, a linear scanning device, an infrared detection device in the focal plane of the lens and a processing circuit for the output signals of the detection device for delivering signals characteristic of co-ordinates X and Y of the source in a reference system centered on the optical axis, in which the detection device comprises two threadlike detectors non-parallel to the scanning direction and non-parallel therebetween and the scanning device comprises means for delivering pulses defining respectively a time origin and the end of a scanning period and a reference pulse indicative of the arrangement of the threadlike detectors, said pulses being applied to the processing circuit.

5 Claims, 6 Drawing Figures

INFRARED DEVIATION MEASURING DEVICE

The present invention relates to an infrared deviation measuring device for determining the position of an infrared deviation source relative to an optical axis. Such a device is in particular applicable in the localization for guidance purposes of a self-propelled missile, the infrared source being formed in this case by a pyrometric tracer carried by the missile.

A device for measuring deviations is already known which comprises a focusing lens, a linear scanning device and a detection device placed in the focal plane of the lens and formed with an array of elementary detectors arranged transversely of the scanning direction. The moment where the detector receives the source radiation and delivers a pulse, supplies, after appropriate processing, the co-ordinate along the scanning direction, and the rank of the elementary detector receiving the radiation supplies the other co-ordinate.

Such a detection device is costly as it involves a large number of elementary detectors.

Moreover, the electronic circuits connected to the outputs of the detectors are very complex since each detector has to be provided with its own output connections.

The object of the invention is to provide an infrared device for measuring deviations which is free from the above-mentioned disadvantages.

There is provided in accordance with the invention a deviation measuring device for localizing an infrared radiation source relative to an optical axis, comprising a focusing lens, a linear scanning device, an infrared detection device in the focal plane of the lens, and a processing circuit for the output signals of the detection device for delivering signals characteristic of the source co-ordinates, X, Y in a reference system centered on the optical axis, in which the detection device comprises two threadlike detectors which are non-parallel to the scanning direction and non-parallel therebetween, and the scanning device comprises means for delivering pulses defining respectively a time origin, and the end of a scanning period and a reference pulse indicative of the arrangement of the threadlike detectors, said pulses being applied to the processing circuit.

The invention will become more apparent from the following description made in reference to the accompanying drawing wherein.

Figure 1:
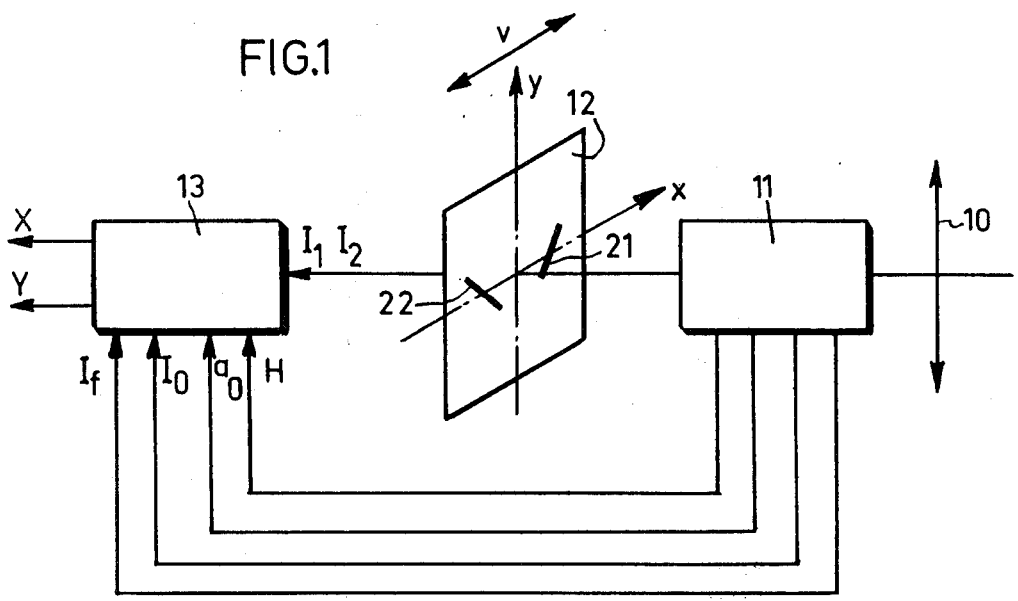
FIG. 1 shows schematically the deviation measuring device.

The deviation measuring device shown in FIG. 1, whose function is to localize an infrared radiation source, comprises a focusing lens 10, for instance of germanium, an infrared detection device 12 placed in the image focal plane of lens 10 and described hereafter, a scanning device 11 along the direction of arrow $v$ and a digital processing circuit 13 delivering from the output signals $I_1$, $I_2$ of the detection device 12 and from reference pulses generated by the scanning device, electrical values proportional to co-ordinates X, Y of the source image M in the detector plane.

Figure 2:
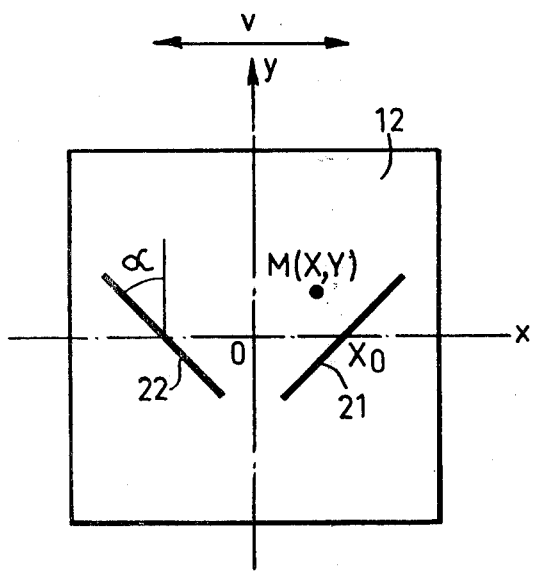
FIG. 2 shows an embodiment of the detection device.

The detection device 12 according to the invention is shown in more detail in FIG. 2. It comprises generally two threadlike detectors 21 and 22 non-parallel, for instance of HgCdTe; in the example shown, detectors 21 and 22 are inclined at an angle $\alpha = 45°$ and placed symmetrically relative to axis Oy orthogonal to the scanning direction $v$. To make things clear, the distance $x_o$ from the origin O to the intersection point of detector 21 or 22 with axis $x'x$, said point being at the center of the respective detector, is in practice of the order of 1 mm.

A simple calculation shows that co-ordinates (X, Y) of the source image may be derived from pulses $I_1$, $I_2$ generated by detectors 21 and 22.

Let it be assumed that at the time origin $t = 0$, the scanning device transmits a reference pulse $a_o$.

A source the image of which in the detector plane is M (X, Y) is detected by detector 21 at moment $t_1$ such as $$X - (x_o + Y tg\alpha) = vt_1,$$

and by detector 22 at moment $t_2$ such as $$X + (x_o + Ytg\alpha) = vt_2$$

In the present case, $\alpha = 45°$ with $tg\alpha = 1$ and the following equations are derived:

$$2X = v(t_2 + t_1)$$

$$2Y = v(t_2 - t_1 - 2t_o), \text{ with } x_o = vt_o.$$

The calculation of X and Y requires therefore, in addition to pulses $I_1$ and $I_2$ transmitted by the detector device 12, a reference pulse $a_o$ which provides the time origin, a reference pulse $I_o$ at moment $t = t_o$, and finally a pulse $I_f$ for defining the end of a scanning period.

These pulses are supplied to the processing circuit 13 at each scanning period by the scanning device 11 which will be hereafter described with reference to FIG. 3. Moreover, said device 11 supplies advantageously a clock signal H to digital circuit 13.

Device 11 comprises a scanning diasporameter comprising two prisms of high index 24 and 25 driven in reverse directions about the same axis. An incremental encoder 26 made of a disc provided with holes, secured to one of the prisms, and an optical electronic device comprising a source 27 and two photo-detectors 28a and 28b, is associated with the diasporameter.

Holes 27a arranged to register once per revolution each with the photo-detector 28a are three in number and their respective functions are to produce pulses $a_o$, $I_o$ and $I_f$. Taking account of the fact that a complete revolution of a prism corresponds to a scanning period in a determined direction, their distribution on the disc 26 may be directly derived from the arrangement of detectors 21 and 22, once the time origin is fixed (in the middle of a scanning period according to FIG. 2). Obviously, it will be possible to vary their widths to make it easier to discriminate between the pulses collected at the output of photo-detector 28a. (The circuits providing such a discrimination are conventional and need not be described here).

Whereas, holes 27b arranged to register with photo-detector 28b are in large number and distributed regularly, since the photo-detector 28b output pulses serve to provide a clock signal H used in the digital circuit 13 as will be seen hereafter.

This association of the diasporameter with an encoding disc is possible because the diasporameter covers an large angular distance for a very small scanning field. The fact that an internal clock is thereby available provides accuracy on the values calculated for X and Y which is independent of the stability of the scanning speed $v$. If on the contrary an external clock was used for circuit 13, the variations of said scanning speed would alter the accuracy.

A digital circuit 13 will now be described in more detail, with reference to FIG. 4, said circuit supplying the required co-ordinates X and Y of the source.

Figure 6:
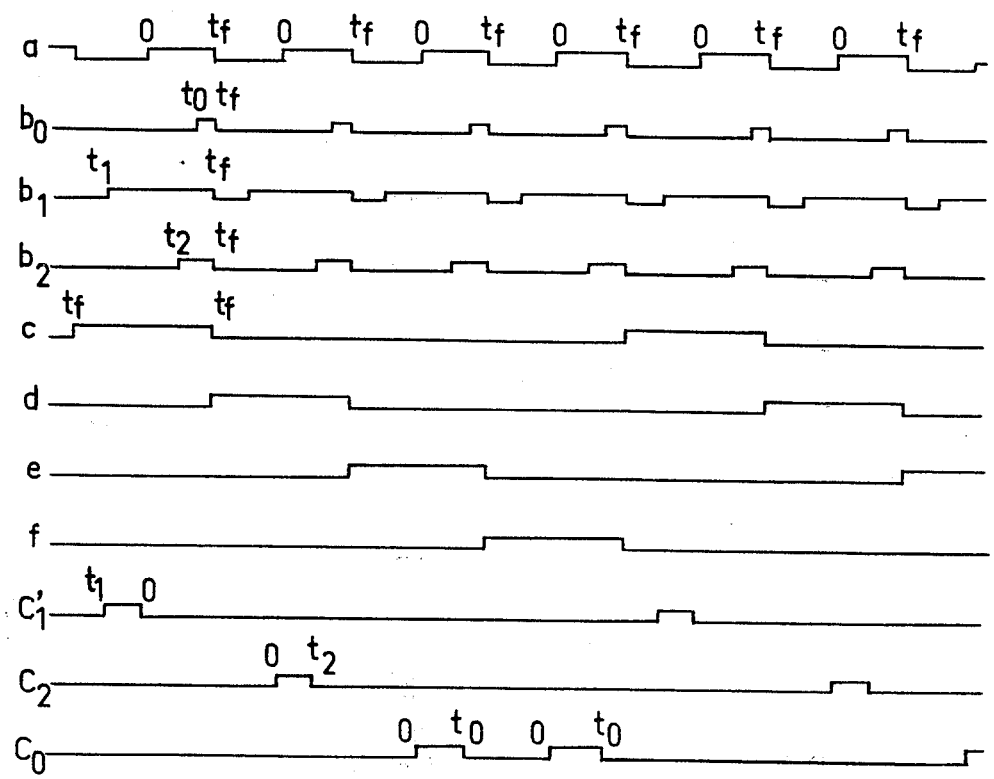
FIG. 6 shows various signals appearing in circuit of FIG. 4.

Said circuit comprises first a flip-flop 31 which receives pulse $a_o$, two flip-flops 32, 33 which receive respectively pulses $I_1$ and $I_2$ through the respective filtering circuits 70 and 71 which will be described hereafter, and a flip-flop 34 which receives pulse $I_o$, all of the flip-flops receiving pulse $I_f$ on their reset input. The corresponding output signals $a$, $b_o$, $b_1$, $b_2$ are represented in FIG. 6 where $t_f$ corresponds to pulse $I_f$.

Figure 5:
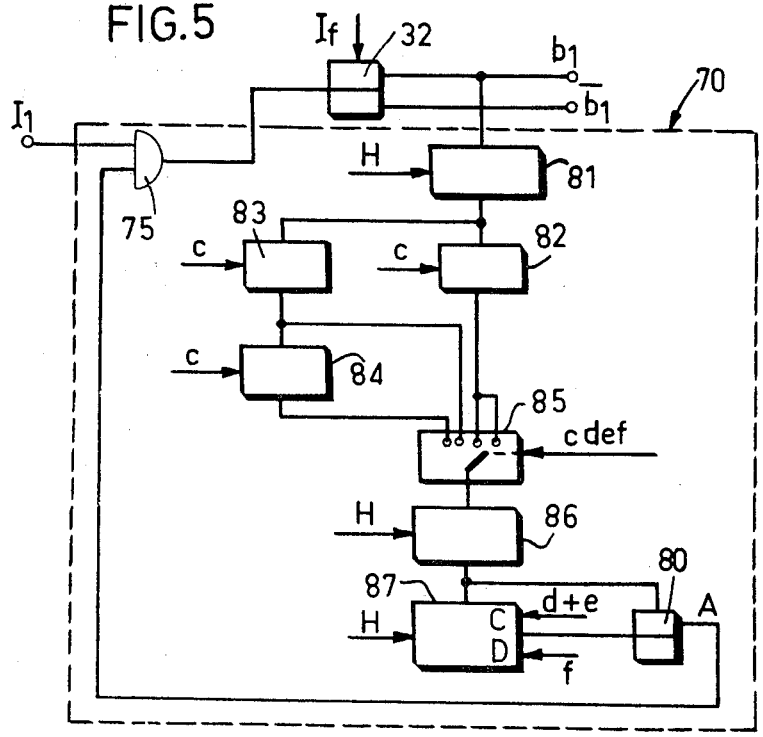
FIG. 5 is a block-diagram of a filtering circuit being part of the circuit of FIG. 4.

Said signals, and the conjugate signals, are applied, through connections symbolized by block 38 to AND gates 41, 41', 42, 42', 40 in the manner shown in FIG. 5.

In addition to said signals, the aforesaid gates receive signals $c$, $d$, $e$ or $f$ coming from a ring counter 45 receiving pulse $I_f$. These signals are shown in the chart of FIG. 6, and it can be seen that they are square signals corresponding to the duration of a scanning period, offset in relation to one another. The recurrence frequency of these signals is therefore one quarter of the scanning frequency.

The output signals $C_1$, $C_2$ of gates 41, 42 have a "1" portion only if respectively $t_1$ and $t_2$ are positive, and the output signals $C'_1$, $C'_2$ of gates 41', 42' have a "1" portion only if $t_1$ and $t_2$ are negative. In the example shown ($t_1 < 0$ and $t_2 > 0$), only $C'_1$ and $C_2$ have portions at logic level 1, $C_1$ and $C'_2$ being always zero.

Due to their combination with signals $c$, $d$, $e$, $f$, signals $C'_1$ and $C_2$, as is shown in FIG. 6, have a "1" portion only every four periods, and signal $C_o$ has two consecutive "1" portions every four periods due to the fact that gate 40 receives the signals from OR gate 48 to which are applied signals $e$ and $f$.

The output signals of the AND gates are applied, combined in appropriate manner by means of OR gates, 52, 53 and 62, 63 to up-down counters 50 and 60 through connections symbolized by block 49.

Figure 3:
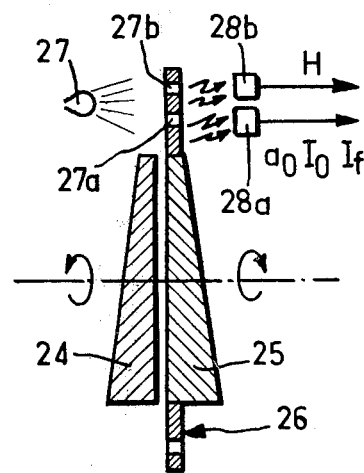
FIG. 3 is a schematic view of a preferred embodiment of the scanning device.

The up-down counters 50 and 60 receive the clock signal H generated by the scanning device of FIG. 3. The clock pulses are counted or down-counted only if the up-down couter 50 (or 60) is enabled by the signals from the aforesaid OR gates.

Signals $C_1$, $C_2$ which, as has already been seen, have "1" portion only if $t_1$ or $t_2$ are respectively positive, are applied to the up-count input 55 of counter 50. Conversely, signals $C'_1$, $C'_2$ which have "1" portion only if $t_1$ and $t_2$ are respectively negative, are applied to the down-count input 56.

Since $t_1$ is negative in the described embodiment, signal $C'_1$ enables down-counting during the first scanning period ("1" portion of signal $c$). Of course, $C_1$ is zero since $t_1$ is negative. During the second period ("1" portion of signal $d$) signal $C_2$ enables counting.

Finally, the up-down counter makes the algebraic addition $t_1 + t_2$, in other words supplies the co-ordinate X in form of a number of pulses, and this every four scanning periods.

The up-down counter 60 makes similarly the operation $t_2 - t_1 - 2 t_o$ for the calculation of Y. It receives $C'_1$ on its up-count input 65 or $C_1$ on the down-count input 66, during the first scanning period. During the second period, it receives $C_2$ on its up-count input and $C'_2$ on its down-count input. Finally, during the third and fourth periods ("1" portions of signals $e$ and $f$), it receives signal $C_o$ on its down-count input.

The up-down counters 50 and 60 thus supply co-ordinates X and Y in digital form, which is of interest for an eventual display or where a digital computer is to be utilized.

The filtering circuit 70 will now be described, said circuit receiving pulse $I_1$ and being connected to the input of flip-flop 32. Circuit 71 which receives pulse $I_2$ is exactly identical to circuit 70.

Circuit 70 transmits pulse $I_1$ only when the latter is produced within determined enabling windows, so that only the source being tracked can effectively be detected by the device.

These enabling windows are defined as follows. If $t_n$ is the duration of the period elapsed between the generation of a pulse $I_1$ during the nth scanning period and the following pulse $I_f$, which value $t_n$ is indicative of the timing of $I_1$, the expected value for $t_{n+1}$ will be $t_n + (t_n - t_{n-1})$ and the width of the window centered on said value is proportional to $(t_n - t_{n-1})$ and has a value of 2 $(t_n - t_{n-1})$ in the described embodiment. This value is advantageous in view of the digital processing. It should be pointed out that such a window is very narrow and provides therefore an excellent filtering effect. Such a narrow width is only possible because the clock necessary for the operation of the circuit is provided by the scanning device 11, and therefore the variations of the scanning speed do not have to be taken in account.

The validation of $I_1$ will be provided by an enabling signal A occupying state "1" during the duration of a window and "0" outside. Said signal A is supplied to the enabling AND gate 75 which receives also $I_1$.

The aforesaid definition for the enabling window is equivalent to the window being defined between moments $t_n$ and $t_n + 2 (t_n - t_{n-1})$. To obtain signal A, it is only needed therefore to apply to a flip-flop 80 two pulses respectively at moments $t_n$ and $t_n + 2 (t_n - t_{n-1})$.

Said pulses are produced by the shown circuit in the following manner.

Flip-flop 32 delivers a signal $b_1$ which, as shown in FIG. 6, occupies state "1" between $I_1$ and $I_f$ that is during time $t_n$. Signal $b_1$ enables a counter 81 receiving the clock pulses H from the scanning device 11.

Figure 4:
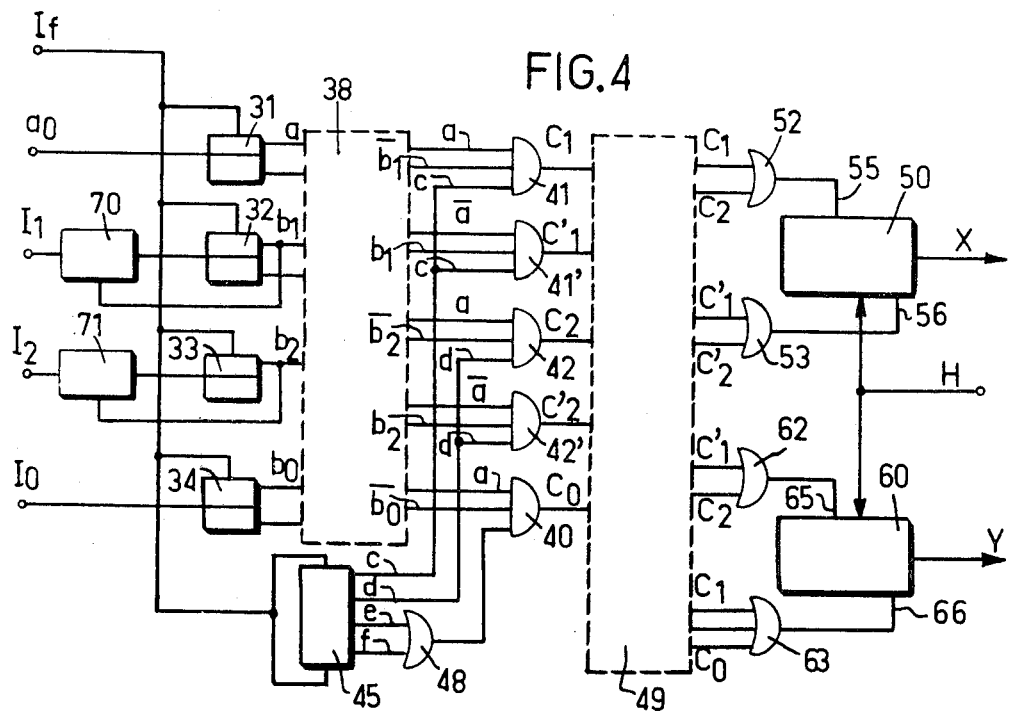
FIG. 4 is a block-diagram of the digital processing circuit supplying the position of the source.

On the other hand, the operation timing of the components of circuit 70 is controlled by signals $c$, $d$, $e$, $f$ from the ring counter 45 of the circuit of FIG. 4, and shown in FIG. 6.

The circuit comprises three registers 82, 83, 84 in which are respectively stored $t_n$, $2t_n$ and $2t_{n+1}$, a switching circuit 85 and two up-down counters 86 and 87 which receive also the clock signals H from the scanning device 11.

The operation is the following:

During the duration of signal $c$, counter 81 counts $t_n$. At the end of signal $c$, the value $t_n$ is transferred to register 82, the value $2t_n$ to register 83 which transfers to register 84 value $2t_{n-1}$ corresponding to the preceding scanning period.

The switching circuit 85 is connected to all of these registers and is controlled by signals $c, d, e, f$ in such manner as to transmit $t_n$ during $c$ and $d$, $2t_n$ during $e$ and $2t_{n-1}$ during $f$.

During $d$, counter 86 counts down from $2t_n$ and counter 87 receiving signal $d$ on its counting input C counts from the beginning of $d$ until the count of counter 86 is zero.

During $e$, counter 86 counts down from $t_n$ and counter 87 receiving signal $e$ on its counting input counts from the beginning of $e$ until the count of counter 86 is zero.

During $f$, counter 86 counts down from $2t_{n-1}$ and counter 87 receiving $f$ on its down-count terminal D counts down from the beginning of $f$ until the count of counter 86 is zero.

As the beginning of the following signal $c$, $t_n$ is transferred to counter 86, then counters 86 and 87 count down. The pulses produced when the counts of counters 86 and 87 are zero are therefore delivered at times $t_n$ and $t_n + 2t_n - 2t_{n-1}$, respectively. These pulses are applied to flip-flop 80 which delivers the enabling signal A.

What we claim is:

1. A deviation measuring device for localizing an infrared radiation source relative to an optical axis, comprising a focalization lens, a linear scanning device, two threadlike detectors non-parallel to the scanning direction and non-parallel therebetween in the focal plane of the lens and a processing circuit for deriving from the output signals of said detectors signals characteristic of co-ordinates X and Y of the source in a reference system centered on the optical axis, said scanning device comprising means for delivering pulses defining respectively a time origin and the end of a scanning period and a reference pulse indicative of the arrangement of the threadlike detectors, said pulses being applied to the processing circuit.

2. A device according to claim 1, in which the processing circuit comprises means for generating square signals associated respectively with the pulses produced by the detectors and the reference pulse, having a duration equal to the interval between the pulse in consideration and the time origin pulse, said square signals being placed each on a different scanning period, two up-down counters, and means for combining said square signals and applying them respectively to up-down counters for the calculation of co-ordinates X and Y.

3. A device according to claim 2, in which the scanning device comprises an scanning diasporameter driving for rotation an incremental encoder, the pulses delivered by said encoder serving to clock said up-down counters.

4. A device according to claim 3, further comprising a filtering circuit, associated with each detector, for invalidating the pulse produced by the respective detector during its ith scanning period when the time of producing $I_1$ is outside a temporal window defined for said ith scanning period, the window relative to the $(n + 1)^{th}$ period being centered at time $t_n + (t_n - t_{n-1})$ and having a width $k [t_n - t_{n-1}]$, $k$ being a positive number, times $t_{n-1}, t_n, t_{n+1}$ being counted within the respective scanning period, the filtering circuit being fed with clock pulses from said incremental encoder.

5. A device according to claim 4, in which $k$ equals 2.

* * * * *